(12) United States Patent
Dos Santos et al.

(10) Patent No.: US 10,460,502 B2
(45) Date of Patent: Oct. 29, 2019

(54) METHOD AND APPARATUS FOR RENDERING OBJECT USING MIPMAP INCLUDING PLURALITY OF TEXTURES

(71) Applicant: SAMSUNG ELECTRONICS CO., LTD., Suwon-si (KR)

(72) Inventors: Francisco Alpalhao de Matos Bandeira Dos Santos, Middlesex (GB); David Gutierrez Fumanal, Middlesex (GB); Joao Pedro Anselmo Da Rosa Jorge, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/842,349

(22) Filed: Dec. 14, 2017

(65) Prior Publication Data
US 2018/0165869 A1    Jun. 14, 2018

(30) Foreign Application Priority Data

Dec. 14, 2016 (GB) .................................. 1621280.5
Dec. 13, 2017 (KR) ........................ 10-2017-0171286

(51) Int. Cl.
*G06T 15/04* (2011.01)
*G06T 15/00* (2011.01)
(Continued)

(52) U.S. Cl.
CPC .......... *G06T 15/04* (2013.01); *G06F 16/2237* (2019.01); *G06T 15/005* (2013.01); *G06T 2210/36* (2013.01)

(58) Field of Classification Search
USPC ........................................................ 345/587
See application file for complete search history.

(56) References Cited

U.S. PATENT DOCUMENTS 6,130,680 A    10/2000 Cox et al.
7,330,188 B1    2/2008 Solanki et al.
(Continued)

FOREIGN PATENT DOCUMENTS

EP            2702561        11/2012
KR    10-2016-0059237 A    5/2016

OTHER PUBLICATIONS

Communication dated Mar. 30, 2018 issued by the International Searching Authority in counterpart International Patent Application No. PCT/KR2017/014762 (PCT/ISA/220, PCT/ISA/210 & PCT/ISA/237).

(Continued)

*Primary Examiner* — Wesner Sajous
(74) *Attorney, Agent, or Firm* — Sughrue Mion, PLLC

(57) ABSTRACT

A method and an apparatus for rendering an object by using a mipmap including N+1 textures having resolutions that are reduced from level 0 to level N are provided. The object may be rendered by obtaining a coordinate of a pixel to be rendered, obtaining an index value related to the obtained coordinate, determining availability of a cached texel with respect to a texel related to the obtained coordinate among texels in a texture of a level identified by the index value, and if the cached texel is available, rendering the pixel by using the cached texel. A method and an apparatus for generating a plurality of index values with respect to a mipmap including N+1 textures having resolutions that are reduced from level 0 to level N are also provided.

17 Claims, 7 Drawing Sheets

(51) Int. Cl.
*G06F 16/00* (2019.01)
*G06F 16/22* (2019.01)

(56) References Cited

U.S. PATENT DOCUMENTS

| | | | |
|---|---|---|---|
| 7,336,277 B1 | 2/2008 | Clark et al. | |
| 8,189,009 B1* | 5/2012 | Brown | G06T 15/04 345/426 |
| 2002/0089512 A1* | 7/2002 | Slade | G06T 15/04 345/582 |
| 2005/0259104 A1* | 11/2005 | Koguchi | G06T 15/04 345/552 |
| 2008/0094409 A1* | 4/2008 | Koguchi | G06T 15/04 345/582 |
| 2008/0303841 A1 | 12/2008 | Newhall, Jr. | |
| 2009/0102851 A1* | 4/2009 | Takemoto | G06T 15/04 345/582 |
| 2013/0321441 A1* | 12/2013 | Pahwa | G09G 5/00 345/582 |
| 2014/0267283 A1* | 9/2014 | Nystad | G06T 9/00 345/428 |
| 2015/0279055 A1 | 10/2015 | Kaburlasos et al. | |
| 2016/0005191 A1 | 1/2016 | Jin et al. | |
| 2016/0071232 A1 | 3/2016 | Goodman et al. | |
| 2016/0078637 A1 | 3/2016 | Park et al. | |
| 2016/0110889 A1* | 4/2016 | Shim | G06T 11/001 345/582 |
| 2016/0140688 A1 | 5/2016 | Lee et al. | |
| 2017/0139707 A1* | 5/2017 | Jang | G06F 9/3012 |

OTHER PUBLICATIONS

Communication dated Jul. 3, 2019, issued by the European Patent Office in counterpart European Application No. 17881808.4.

Beers, et al., "Rendering from Compressed Textures", Dec. 31, 1996, Siggraph '96 Proceedings, XP040084483, pp. 373-378, 4 pages total.

* cited by examiner

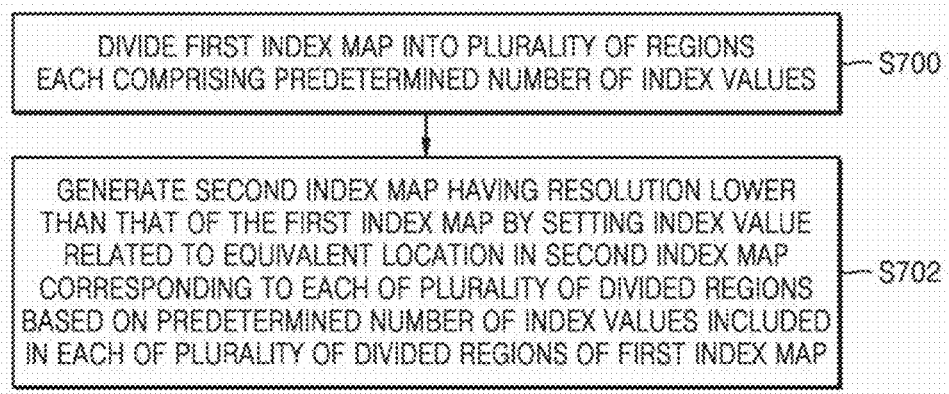
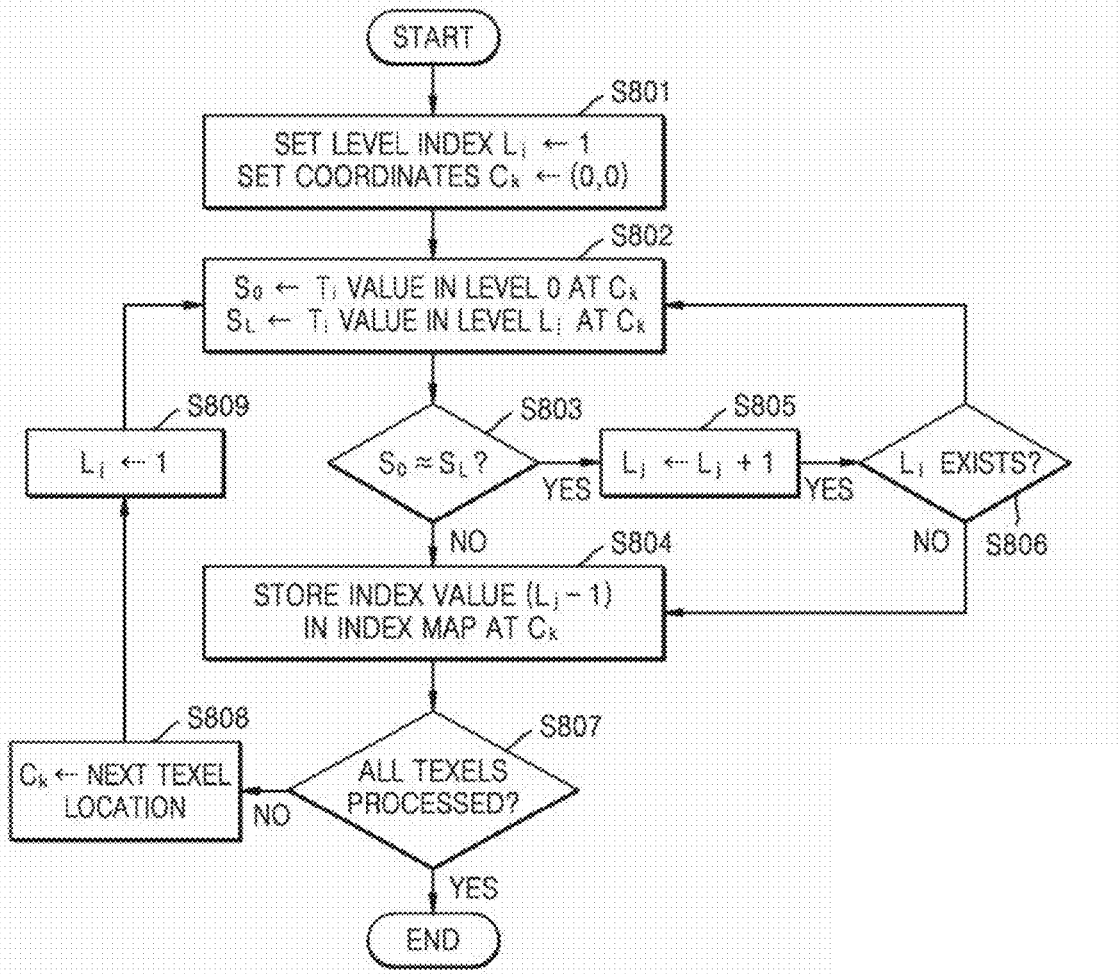

METHOD AND APPARATUS FOR RENDERING OBJECT USING MIPMAP INCLUDING PLURALITY OF TEXTURES

CROSS-REFERENCE TO RELATED APPLICATION

This application claims priority from GB Patent Application No. 1621280.5, filed on Dec. 14, 2016, in the Intellectual Property Office of the United Kingdom, and Korean Patent Application No. 10-2017-0171286, filed on Dec. 13, 2017, in the Korean Intellectual Property Office, the disclosures of which are incorporated herein in their entireties by reference.

BACKGROUND

1. Field

Apparatuses and methods consistent with exemplary embodiments relate to mipmap rendering, and more particularly to, a method and an apparatus for rendering an object using a mipmap including a plurality of textures.

2. Description of the Related Art

MIP maps, or "mipmaps," are commonly used during real-time rendering to increase rendering speed, by making memory accesses more efficient. A mipmap comprises a plurality of versions of the same texture image, at different resolutions. A high-resolution mipmap image will be used when rendering an object close to the camera, and a low-resolution mipmap image will be used when rendering an object further from the camera. This approach is more efficient than down-scaling a higher-resolution version of the texture in real-time, which would require the high-resolution texture to be loaded into memory and then downfiltered to reduce the resolution.

The performance of a real-time rendering process is strongly dependent on memory accesses, since inefficient memory usage can result in slower rendering and higher power consumption. By using a low-resolution mipmap image when an object is further from the camera, fewer texture elements, called texels, are loaded when rendering the object, thus reducing the number of memory accesses. The use of mipmaps can therefore increase the rendering speed and reduce power consumption. However, a further improvement over current mipmap rendering methods would still be desirable.

SUMMARY

One or more exemplary embodiments may provide methods and apparatuses for rendering a pixel of an object using a cashed texel in a mipmap level texture according to an index value.

Additional aspects will be set forth in part in the description which follows and, in part, will be apparent from the description, or may be learned by practice of the presented exemplary embodiments.

According to an aspect of an exemplary embodiment, a method of rendering an object by using a mipmap including N+1 textures having resolutions that are reduced from level 0 to level N may include obtaining a coordinate of a pixel to be rendered; obtaining an index value related to the obtained coordinate; determining availability of a cached texel with respect to a texel related to the obtained coordinate from among texels in a texture of a level identified by the index value; and if the cached texel is available, rendering the pixel by using the cached texel.

The index value may be one of a plurality of index values that are stored at different locations in an index map having the same resolution as that of the texture of the level 0.

The index value may be one of a plurality of index values that are stored at different locations in an index map having a resolution lower than that of the texture of the level 0.

A bit depth of the index value may be smaller than a total number of texture levels included in the mipmap.

The mipmap may include a predetermined number of texture sets each including the N+1 textures, the index value may be stored in an index map related to the predetermined number of texture sets and the predetermined number of index values related to a different one of the predetermined number of texture sets are stored in each location of the index map, and the index value related to a texture set used for the rendered pixel, from among the predetermined number of index values, may be obtained.

Each of the predetermined number of index values stored in each location of the index map may be stored in a different texture channel.

The predetermined number of index values respectively stored in each location of the index map may be stored as a concatenated bit string, and a bit mask, for selecting one or more bits from a bit string defining the index value related to the texture set used for the rendered pixel, may be used.

According to an aspect of another exemplary embodiment, a method of generating a plurality of index values with respect to a mipmap including N+1 textures having resolutions that are reduced from level 0 to level N may include selecting a texture of a first level from the N+1 textures; determining whether a first texel in the texture of the first level matches a second texel in a texture of a second level that is higher than the first level, wherein a location of the second texel in the second level corresponds to a location of the first texel in the first level; if the first texel and the second texel do not match, setting an index value identifying the first level as an index value for the first texel; if the first texel and the second texel match, repeatedly determining whether the first texel and the second texel match by repeatedly increasing the second level by a predetermined value until a second texel that does not match the first text occurs; if a second texel that does not match the first texel does not occur, setting an index value identifying the second level, that has been finally increased to a predetermined level, as an index value for the first texel; if a second texel that does not match the first texel occurs, setting an index value identifying a level reduced by the predetermined value from the second level at which the second texel that does not match the first texel occurs as the index value for the first texel; and setting index values for the remaining texels of the texture of the first level by applying previous operations to the remaining texels of the texture of the first level.

The first level may be level 0.

When a texel value of the first texel differs from a texel value of the second texel by less than a threshold value, it may be determined that the first texel and the second texel match.

Bit depths of the set index values may be smaller than a total number of texture levels included in the mipmap.

The set index values may define a first index map having a resolution the same as that of the texture of the first level, the method may further include: dividing the first index map into a plurality of regions each including a predetermined number of index values; and generating a second index map having a resolution lower than that of the first index map by setting an index value related to an equivalent location in the second index map corresponding to each of the plurality of divided regions based on the predetermined number of index values included in each of the plurality of divided regions of the first index map.

The index value related to the equivalent location in the second index map may be set to be same as a minimum value from among the predetermined number of index values included in the plurality of divided regions of the first index map.

According to an aspect of another exemplary embodiment, an apparatus for rendering an object by using a mipmap including N+1 textures having resolutions that are reduced from level 0 to level N may include: a first memory configured to store texels related to the N+1 textures; a second memory having an access rate faster than that of the first memory and configured to cache the texels from the first memory; and a rendering unit configured to obtain a coordinate of a pixel to be rendered, obtain an index value related to the obtained coordinate, determine the availability of a cached texel in the second memory with respect to a texel related to the obtained coordinate among texels in a texture of a level identified by the index value, and if the cached texel is available, render the pixel by using the cached texel.

BRIEF DESCRIPTION OF THE DRAWINGS

These and/or other exemplary aspects and advantages will become apparent and more readily appreciated from the following description of the exemplary embodiments, taken in conjunction with the accompanying drawings in which:

FIG. 7 is a flowchart showing a method of generating a lower-resolution index map from a higher-resolution index map, according to an exemplary embodiment;

FIG. 8 is a flowchart showing a method of generating an index map with a resolution equal to a resolution of the texture at level 0, according to an exemplary embodiment;

DETAILED DESCRIPTION

Figure 1:
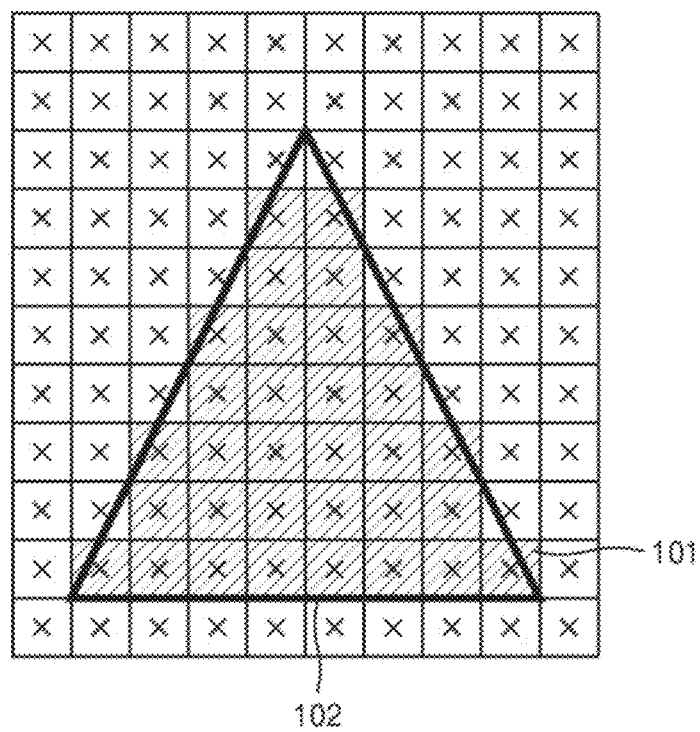
FIG. 1 illustrates an example of a rasterized triangle.

In the following detailed description, only certain exemplary embodiments have been shown and described, simply by way of illustration. As those skilled in the art would realize, the described embodiments may be modified in various different ways, all without departing from the scope. Accordingly, the drawings and description are to be regarded as illustrative in nature and not restrictive Like reference numerals designate like elements throughout the specification.

Figure 2:
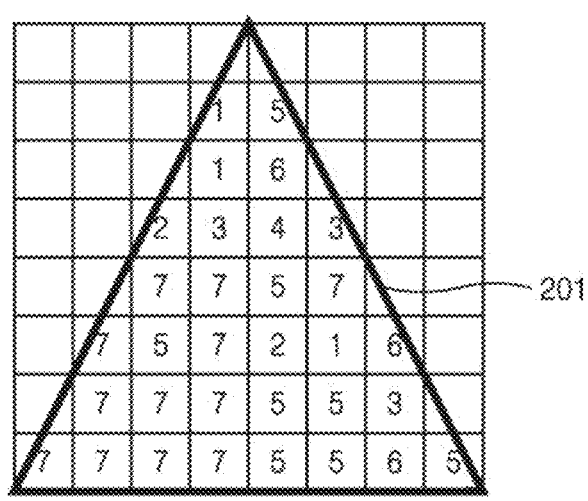
FIG. 2 illustrates the rasterized triangle of FIG. 1 after texture mapping, according to an exemplary embodiment.

A method of rendering an object using a mipmap according to an exemplary embodiment will now be described, with reference to FIGS. 1 to 5. In the present embodiment, a method of rendering a rasterized triangle is described by way of an example. In another embodiment, a similar method may be used to render a different type of polygon. FIG. 1 illustrates an example of a rasterized triangle. In FIG. 1, the shaded pixels 101 indicate pixels that are to be rendered as part of the rasterized triangle 102. FIG. 2 illustrates the rasterized triangle of FIG. 1 after performing texture mapping using the level 0 texture from a mipmap illustrated in FIG. 3. In FIG. 2, the number in each pixel 201 denotes the texture value applied to that pixel. Similarly, in FIG. 3 the number in each texel denotes the texture value to be used when rendering a pixel whose coordinates lie within that texel.

Figure 3:
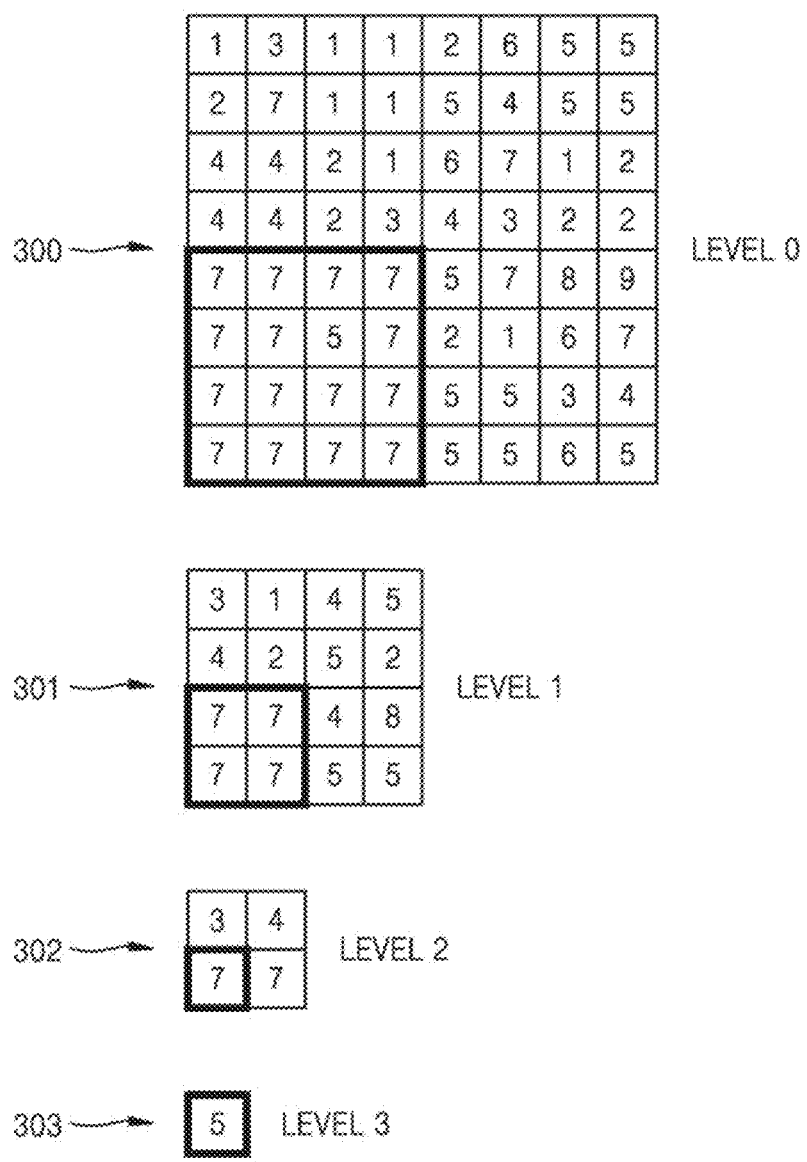
FIG. 3 illustrates a mipmap for rendering the rasterized triangle of FIG. 1, according to an exemplary embodiment.

FIG. 3 illustrates a mipmap for rendering the rasterized triangle of FIG. 1, according to an exemplary embodiment. In the present example the mipmap comprises four textures 300, 301, 302, 303 at four different resolution levels 0 to 3, where level 0 denotes the highest-resolution version of the texture and level 3 denotes the lowest-resolution version of the texture. However, it will be understood that the general principles disclosed herein can be applied to mipmaps with any number of levels, and hence embodiments are not limited to four mipmap levels as illustrated in FIG. 3.

Figures 4, 5:
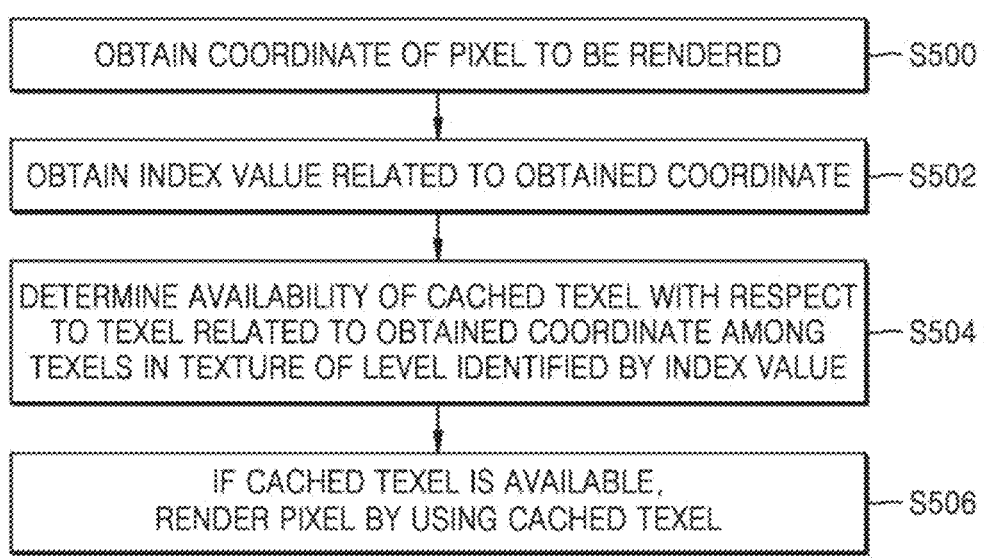
FIG. 4 illustrates an index map for the mipmap of FIG. 3, according to an exemplary embodiment.
FIG. 5 is a flowchart showing a method of rendering an object by using a mipmap, according to an exemplary embodiment.

FIG. 4 illustrates an index map for the mipmap of FIG. 3, according to an exemplary embodiment. In the present embodiment, an index map 400 is provided which comprises a plurality of index values, as shown in FIG. 4. The index map 400 is used during the mipmap rendering process to increase memory access coherency, by enabling the re-use of cached texels. Each of the index values identifies one of the texture levels.

A method of rendering an object from a mipmap using an index map 400 such as the one shown in FIG. 4 will now be described with reference to FIG. 5. FIG. 5 is a flowchart showing a method of rendering an object using a mipmap according to an exemplary embodiment, and apparatus for implementing the method is schematically illustrated in FIG. 9.

Figure 9:
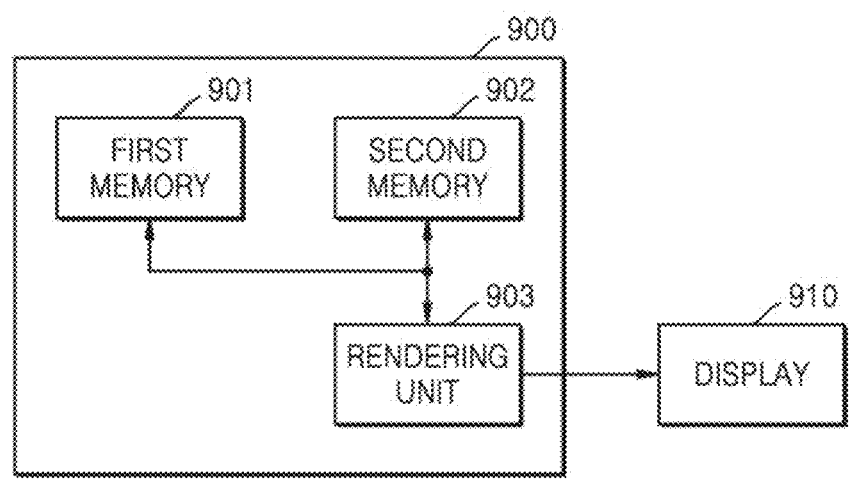
FIG. 9 illustrates apparatus for rendering an object using a mipmap, according to an exemplary embodiment.

FIG. 9 illustrates apparatus for rendering an object using a mipmap, according to an exemplary embodiment. The apparatus 900 comprises a first memory 901 for storing texels associated with the plurality of textures, and second memory 902 for caching texels from the first memory 901. According to an exemplary embodiment, the first memory 901 may be a main memory, and the second memory 902 may be a cache memory. The second memory 902 may have a faster access speed than the first memory 901, and is used to cache texels that have been read from the first memory 901. As will become apparent from the following description, the use of an index map 400 as shown in FIG. 4 can increase the rendering speed and decrease the power consumption of the apparatus 900 by reducing the number of calls to the first memory 901.

The apparatus 900 further comprises a rendering unit 903 for rendering an object using a mipmap and an associated index map, and for outputting the rendered object to a display 910. Depending on the embodiment, the rendering apparatus 900 and the display 910 may be included in the same device, or may be embodied in physically separate devices. The rendering unit 903 can include one or more processors which execute computer program instructions stored in computer-readable memory, for example the first memory 901 or in a separate memory. When executed, the computer program instructions can cause the rendering unit 903 to perform the method shown in FIG. 5. Alternatively, in other exemplary embodiments the functions of the rendering unit 903 can be performed by hardware rather than in software.

Continuing with reference to the flowchart of FIG. 5, in S500 the rendering unit 903 obtains the coordinates of a pixel to be rendered. The coordinates of a pixel may be defined as two-dimensional coordinates (x, y) which identify the location of the pixel within the object. For example, the coordinate indices x and y may be defined as floating point values between 0 and 1, where (0, 0) defines the upper-left corner of the object and (1, 1) defines the lower-right corner of the object. It will be understood that this is merely one example of a way in which the pixel coordinates could be defined, and different forms of coordinates could be used in other embodiments.

Next, in S502 the rendering unit 903 obtains the index value related to the obtained coordinates. Here, the index value related to the coordinates means the index value that is found at the location within the index map that is defined by the coordinates. For example, if pixel coordinates of (0.1875, 0.5625) were obtained in S500, this would correspond to the center point of the fifth index value 401 in the second column in the index map 400 of FIG. 4. Accordingly, the index value of '2' would be obtained in S502, identifying the texture 302 at level L=2 in the mipmap.

Then, in S504 and S506 the rendering unit 903 determines availability of the cached texel with respect to a texel relating to the obtained coordinates among texels in textures of the level that is identified by the index value obtained in S502, and, if the cached texel is available, the rendering unit 903 renders the pixel by using the cached texel. As shown in FIG. 3, in the present example many of the texels in the lower left quadrant of the texture 300 at level L=0 all have the same value ('7'), which is the same value as the texel in the equivalent location in the texture 302 at level L=2. In the index map 400 of FIG. 4, a plurality of index values within the lower left quadrant of the texture 300 at level L=0 are set to identify the level L=2.

Accordingly, whenever a pixel at a location within the lower left quadrant in the L=0 texture 300 is to be rendered, the rendering unit 903 can render the pixel using the same texel, which will be stored in the cache memory 902 after the first pixel using that texel has been rendered. By comparison, a conventional mipmap rendering process without using an index map would render each pixel within the lower left quadrant of the L=0 texture 300 by reading a separate texel from the L=0 texture 300, resulting in the slower main memory being accessed multiple times.

Exemplary embodiments take advantage of the fact that each texel in a lower-resolution texture covers a plurality of texels in a higher-resolution texture, and that the information contained in a mipmap level of a texture often remains constant or barely changes over large areas. Therefore a plurality of texels in the higher-resolution texture can all be rendered using the same texel at an equivalent location in the lower-resolution texture, instead of accessing separate texels. In this way, exemplary embodiments of the invention may increase memory access coherency by indexing lower resolution mipmap levels of textures in areas where data is known to be constant. In contrast, related art mipmap rendering methods require a higher amount of bandwidth, particularly when using large amounts of texture information for high-quality rendering. Bandwidth is one of the limiting factors in real-time rendering, since high bandwidth usage increases the power consumption and decreases the overall performance.

Furthermore, in order to obtain a performance benefit, it is only necessary for a single pixel to be rendered using a cached texel instead of having to access a different texel stored in the main memory. Therefore, it is not essential for all texels in the area covered by one texel in a lower-resolution texture to share the same value. In the example shown in FIG. 3, one of the sixteen texels in the lower left quadrant L=0 texture 300 in FIG. 3 has a value of 5. Accordingly, the index value for this texel is set to identify L=0, whereas the index values for the remaining fifteen texels are all set to identify L=2.

Depending on the embodiment, the index values may be stored at a bit depth equal to the total number of texture levels included in the mipmap, or may be stored at a lower bit depth. In the exemplary embodiment shown in FIGS. 3 and 4 the index map is only linked to three out of the four mipmap levels (L=0, 1, 2), but in other exemplary embodiments the index values may link the index map to all of the mipmap levels. If a mipmap comprises five levels, for example, the index values would need to be stored at a bit depth equal to three in order to be able to uniquely identify any of the five mipmap levels. However, if the index values only link the index map to four of the mipmap levels, a bit depth of two could be used. In some exemplary embodiments, one or more of the mipmap levels may not be considered when generating the index map, so as to reduce the bit depth of the resulting index map and therefore reduce the amount of memory required to store the index map.

As an example, the full cost of accessing all the texels in 2 RGBA8 textures (two 32-bit RGB with Alpha textures) with a resolution of 1024×1024 pixels, using a conventional mipmap rendering method, would be:

$$2\ \text{RGBA8} \times (1024 \times 1024) \text{pixels} = \sim \text{MB}$$

Assuming the texture has ⅔ varying and ⅓ constant data, the cost of rendering the textures using an index map would be:

$$[1024 \times 1024\ \text{pixels} \times 1R8(\text{Index Map})] + [680 \times 1024\ \text{pixels} \times \text{RGBA8}] + 16\ \text{bytes (accessing penultimate mipmap level of texture)} = \sim 6\ \text{MB or}$$

$$[4 \times 4\ \text{pixels} \times 1R8(\text{Reduced Index Map})] + [680 \times 1024\ \text{pixels} \times 2\ \text{RGBA8}] + 64\ \text{bytes (accessing antepenultimate mipmap level of texture)} = \sim 5\ \text{MB}$$

Therefore in this example, a bandwidth savings of more than 30% is obtained when using a reduced index map (i.e. accessing an antepenultimate mipmap level of texture). The additional cost associated with the index map method is mainly in the pre-processing stage, specifically generating the index map. This only needs to be performed once for each mipmap, and can take place offline.

Figure 6:
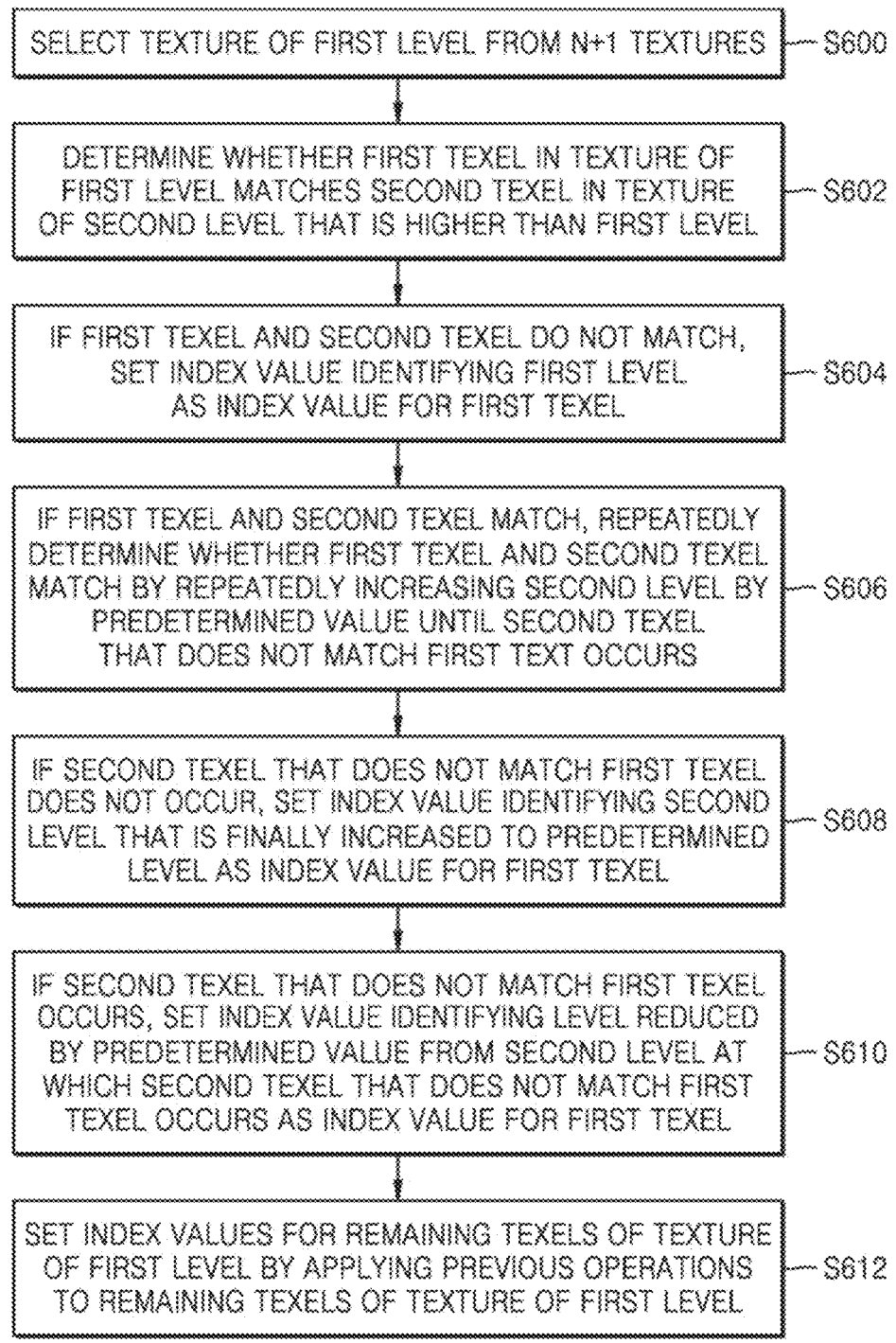
FIG. 6 is a flowchart showing a method of generating a plurality of index values for a mipmap, according to an exemplary embodiment.

FIG. 6 is a flowchart showing a method of generating a plurality of index values for a mipmap, according to an exemplary embodiment. According to an exemplary embodiment, the mipmap may include N+1 textures having resolutions that are reduced from level 0 to level N. Referring now to FIG. 6, a method of generating an index map is illustrated, according to an exemplary embodiment. An apparatus for implementing the method is schematically illustrated in FIG. 10.

Figure 10:
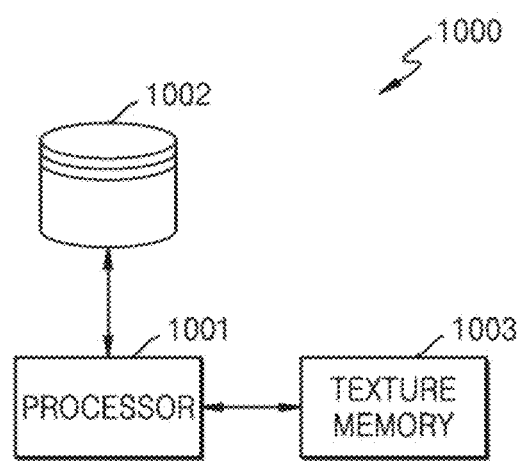
FIG. 10 illustrates apparatus for generating a plurality of index values for a mipmap, according to an exemplary embodiment.

FIG. 10 illustrates apparatus for generating a plurality of index values for a mipmap, according to an exemplary embodiment. The apparatus 1000 comprises a processor 1001 for executing computer program instructions stored in a program memory 1002, and further comprises texture memory 1003 for storing textures to be analyzed when generating the index map. In some embodiments, the program memory 1002 and texture memory 1003 can be different areas of the same physical memory. Furthermore, although a software implementation is illustrated in the present exemplary embodiment, in other embodiments the functions of the processor 1001 can be performed by hardware rather than in software.

As shown in FIG. 6, in S600 and S602 the processor 1001 selects a texture of a first level from the N+1 textures and determines whether a first texel included in the texture of the first level is a match for a second texel included in a texture of a second level higher than the first level. A location of the first texel may correspond to a location of the second texel. According to an exemplary embodiment, when a texel value of the first texel is different from a texel value of the second texel by less than a threshold value, the first texel may be determined to be the match for the second texel.

According to a result of determination in S602, if the first texel is not a match for the second texel, the processor 1001 may set an index value identifying the first level as an index value of the first texel in S604. If the first texel is a match for the second texel, the processor 1001 may repeatedly determine whether the first texel is a match for the second texel while repeatedly increasing the second level by a predetermined value until a second texel that is not a match for the first texel occurs in S606.

According to a result of performing in S606, if the second texel that is not a match for the first texel does not occur, the processor 1001 may set an index value identifying the second level that is finally increased to a predetermined level as the index value of the first texel in S608. If the second texel that is not a match for the first texel occurs, the processor 1001 may set an index value identifying a level that is reduced by a predetermined value from the second level at which the second texel that is not a match for the first texel occurs as the index value of the first texel in S610.

Then, in S612 the processor 1001 may set index values of other texels of the texture of the first level by repeatedly applying S602 to S610 to the other texels of the texture of the first level, in order to set the plurality of index values for the index map. Finally, in S604 the resulting index values may be stored as the index map.

In the embodiment illustrated in FIGS. 3 and 4, a plurality of index values each associated with a different texel are stored as an index map with a resolution equal to a resolution of the texture at level L=0. This can ensure that no information is lost, since each index value can be set to identify level L=0 if a matching texel value is not found at a lower resolution level. However, in other embodiments a lower-resolution index map may be used. A method of generating a lower-resolution index map from a higher-resolution index map is illustrated in FIG. 7. According to an exemplary embodiment, a plurality of index values of a mipmap may define a first index map having the same resolution as that of the texture of the first level, and a second index map having a lower resolution than that of the first index map may be generated from the first index map. In a relative viewpoint, the first index map may be a high-resolution index map, and the second index map may be a low-resolution index map.

Referring to FIG. 7, first, in S700 the first index map is subdivided into a plurality of regions each comprising a predetermined number of index values. For example, to reduce the size of the index map by a factor of four, the index map can be subdivided into a plurality of 2×2 blocks each containing four index values.

Then, in S702 an index value associated with an equivalent location in the second index map corresponding to each of the plurality of subdivided regions is set based on the predetermined number of index values contained within each of the plurality of subdivided regions of the first index map. According to an exemplary embodiment, the index value associated with the equivalent location in the second index map may be set to be equal to a minimum value among the predetermined number of index values contained within each of the plurality of subdivided regions of the first index map. Taking the example in which each region is a 2×2 block containing four index values, the lowest mipmap level index (i.e. closest to L=0) among the four index value within each region may be used as the index value for that region in the lower-resolution index map. Here, the 'lowest value' means the index value which identifies the highest-resolution level amongst a plurality of levels that are identified by the plurality of index values within said region. Selecting the lowest mipmap level ensures that there is no loss of quality when generating the lower-resolution index map.

Alternatively, in other embodiments, the index value associated with the equivalent location in the second index map can be set to identify a level higher than the lowest level identified by the predetermined number of index values contained within each of the plurality of subdivided regions of the first index map. For example, an index value in the lower-resolution index map can be set by considering the difference in texture values for the corresponding texels at the levels identified by the index values. If the texture values differ by less than a threshold amount, a higher one of the mipmap levels (i.e. lower-resolution level) may be set for the index value. The threshold may be set according to perceptual importance. That is, the threshold may be set to be small enough that the difference between texture values would not be noticeable when a user views the rendered image. In one exemplary embodiment, the index value in the second index map can be set to be equal to the lowest index value among the top Nth percentile in the plurality of index values contained within said region in the first index map.

Referring now to FIG. 8, a method of generating an index map with a resolution equal to a resolution of the texture at level 0 is illustrated, according to an exemplary embodiment. Although in the present embodiment an index map with resolution equal to mipmap level L=0 is generated, it should be understood that a similar process can be followed to generate index maps of lower resolutions. A method such as the one shown in FIG. 8 may be used by apparatus such as that shown in FIG. 10 in order to generate an index map.

First, in S801 a level index variable Lj is initialized to 1, and a coordinate variable Ck is initialized to (0, 0). Then, in S802 a first sample S0 is set as the texture value Ti at coordinates Ck in the level L=0 texture, and a second sample SL is set as the texture value Ti at coordinates Ck in the level L=Lj texture.

The first and second samples S0, SL are then compared to each other in S803 to determine whether they are a match. In some exemplary embodiments, at S803 it may be determined that the samples are a match if the two sample values are identical. In other embodiments, at S803 it may be determined that the samples are a match if the first and second sample values differ by less than a threshold amount. The threshold may be set according to perceptual importance. That is, the threshold may be set to be small enough that the difference between two pixels with texture values which differ by less than the threshold would be imperceptible in a rendered image.

In the present exemplary embodiment, if the two samples are not a match, then in S804 the index value at coordinates Ck is set to identify the level (Lj−1). In this way, if the texture value at a particular location in level L=0 does not match the texture value in the same location at level L=1, for example, the index value is set to L=0. This ensures that no image quality is lost when rendering using the index map, since the renderer only uses a cached texel from a higher mipmap level if it can replace the texel from the lower level texture without the difference being noticeable to a user. Furthermore, if an exact match is required in S803 then a lossless rendering method is achieved, since a cached texel from a higher mipmap level will only be used when it is identical to the lower-level texel that it is replacing.

In the example illustrated in FIG. 8, when a pixel sample in one level is determined not to match the sample from level 0, the algorithm is configured to store the previous level in which a match was found as the index value. Accordingly, if a sample at a particular location in level 0 matches the sample at the same location in levels 1 and 3, but not in level 2, the algorithm would terminate when searching level 2 and set the index value for that location to identify level 1, without proceeding to search level 3. For example, in the mipmap illustrated in FIG. 3, the lower right-hand texel in level 0 is a match for the samples in the same location at levels 1 and 3 but not at level 2, and so the index value in this location in the index map of FIG. 4 is set to 1. However, in other exemplary embodiments the algorithm could be configured to continue searching for matches in higher levels even when a non-matching sample is found in an intermediate level, so that the index value at a particular location may thus be set to identify the highest mipmap level in which there is a matching sample. In some scenarios this can result in a further efficiency improvement.

On the other hand, if the samples are a match at S803 then the process continues through S805 and S806 to examine the next mipmap level, Lj+1. If it is determined that there are no higher levels in S806, then the process returns to S804 and sets the index value for coordinates Ck to identify the level (Lj−1).

Once an index value has been set for the current coordinates Ck, the process continues to S807 where it is checked whether there are any texels left in the level L=0 texture that have not yet been processed. If there are still texels to be processed, then in S808 the coordinate variable Ck is set to the coordinates of the next texel to be processed. The process then resets the level index variable Lj to level 1 in S809, and returns to S802 to set new first and second sample values S0, SL using the texture values at the new coordinates Ck.

In the present exemplary embodiment, the index map generation process is configured to include all mipmap levels. Depending on the texture values, this may result in an index map with a bit depth equal to the number of mipmap levels. In other exemplary embodiments, the process could be modified to generate an index map with a smaller bit depth than the number of mipmap levels. For example, S805 could be modified to increase the level by two or more during each iteration, thereby skipping mipmap levels when comparing texture values. As a further example, S806 could be modified to terminate the process before the final mipmap level is reached, for example by checking whether a level Lj+N exists, where N is an integer greater than one.

Figure 11:
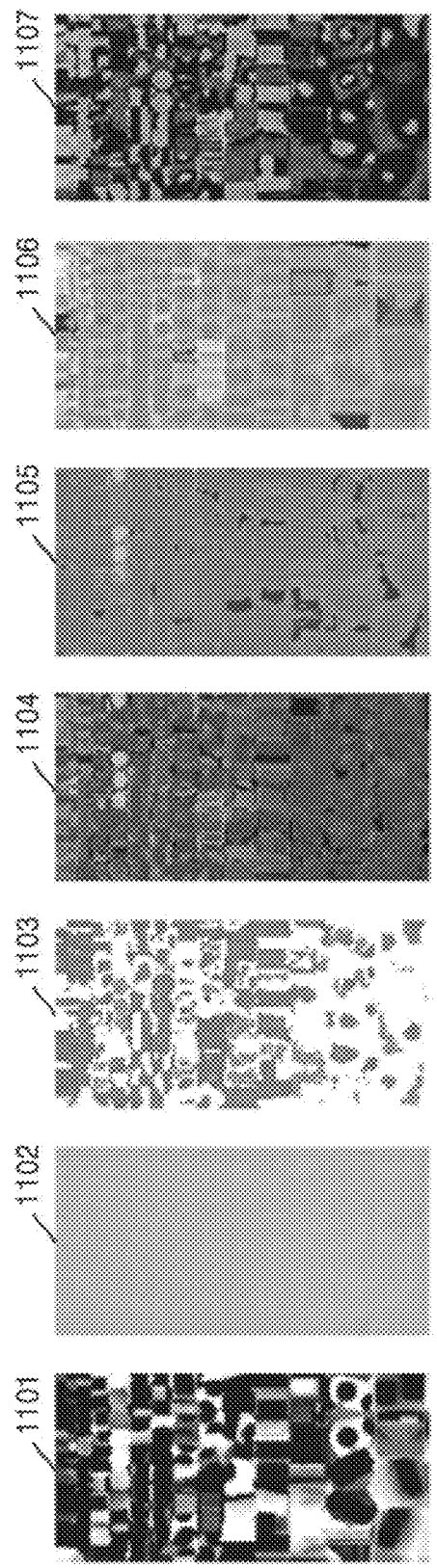
FIG. 11 illustrates a plurality of texture sets for rendering a surface, according to an exemplary embodiment.

In some exemplary embodiments, a mipmap may include a predetermined number of texture sets each including the N+1 textures, and an index map can be produced from the mipmap including a set of input textures. Such embodiments may find use in real-time realistic rendering applications, such as Physically-Based Rendering (PBR), which requires a large number of textures to describe a material surface. FIG. 11 illustrates a set of seven textures 1101, 1102, 1103, 1104, 1105, 1106, 1107, which together can be used to render a realistic surface. Simplified models may use a smaller number of textures, for example four textures, but more complex models may use up to eight or more textures. In exemplary embodiments in which a plurality of textures are used to render a particular object, index values may be stored in an index map relating to the predetermined number of texture sets, and each of a predetermined number of index values, relating to a different one of the predetermined number of texture sets, is stored in each location of the index map. During the rendering process, an index value, relating to a texture set used for a pixel to be rendered, from among the predetermined number of index values, is obtained and used to render the pixel.

For example, in some exemplary embodiments each one of the plurality of index values associated with each location can be stored in a different texture channel (e.g. In an R, G, B, or A channel). Alternatively, the plurality of index values associated with each location can be stored as a concatenated bit string, and a bit mask may then be used to select one or more bits from the bit string which define the index value relating to the texture set used for the pixel to be rendered.

Exemplary embodiments have been described in which index maps can be generated for use when rendering objects from a mipmap. The use of an index map can enable more efficient access to mipmapped textures in which data is known to be constant or nearly constant in certain areas of the textures. The textures can have any dimensionality, for example 1D, 2D or 3D, and can be indexed using coordinates suitable for their dimensionality. The index map technique improves memory accesses, and can provide a faster and more efficient rendering process in comparison to related art mipmap rendering methods.

A method and an apparatus for rendering an object using a mipmap including N+1 textures with resolutions that are reduced from level 0 to level N according to an exemplary embodiment may use a cached texel in a mipmap level texture according to an index value when rendering a pixel, thereby increasing a rendering speed and reducing power consumption.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of rendering an object by using a mipmap comprising N+1 textures having resolutions of levels 0 through N, wherein a resolution decreases from level 0 to level N, the method comprising:
   obtaining a coordinate within the object of a pixel to be rendered;

obtaining an index value related to the obtained coordinate, wherein the index value identifies one of the level 0 through level N;

determining an availability of a cached texel related to the obtained coordinate among texels in a level identified by the index value; and if the cached texel is available, rendering the pixel by using the cached texel, wherein the mipmap comprises a first predetermined number of texture sets each of the predetermined number of texture sets comprising the N+1 textures, wherein the index value is stored in an index map related to the first predetermined number of texture sets, wherein each of a plurality of locations of the index map stores one of a second predetermined number of index values, wherein the second predetermined number is the same as the first predetermined number, and each of the second predetermined number of index values is related to one of the first predetermined number of texture sets, and wherein obtaining the index value comprises obtaining the index value related to a texture set used for the pixel to be rendered, from among the second predetermined number of index values.

2. The method of claim 1, wherein the index value is one of a plurality of index values that are stored at locations in the index map, wherein a resolution of the index map and a resolution of the texture of the level 0 are the same.

3. The method of claim 1, wherein the index value is one of a plurality of index values that are stored at locations in the index map, wherein a resolution of the index map is lower than a resolution of the texture of the level 0.

4. The method of claim 1, wherein a bit depth of the index value is smaller than a total number of texture levels included in the mipmap.

5. The method of claim 1, wherein each of the second predetermined number of index values is stored in a different texture channel.

6. The method of claim 1, wherein the second predetermined number of index values stored in the index map is stored as a concatenated bit string, and the obtaining the index value comprises using a bit mask for selecting one or more bits from a bit string defining the index value related to the texture set used for the rendered pixel.

7. The method of claim 1, wherein the coordinate is a floating point value between 0 and 1.

8. A method of generating a plurality of index values with respect to a mipmap comprising N+1 textures having resolutions of levels 0 through N, wherein a resolution decreases from level 0 to level N, the method comprising:

selecting a texture of a first level from among the N+1 textures;

determining whether a first texel in the texture of the first level matches a second texel in a texture of a second level that is higher than the first level, wherein a location of the second texel corresponds to a location of the first texel;

if the first texel and the second texel do not match, setting an index value identifying the first level as an index value for the first texel;

if the first texel and the second texel match, repeating the determining whether the first texel and the second texel match by repeatedly increasing the second level by a predetermined value until determining that the first texel and the second texel do not match;

if the second texel that does not match the first texel does not occur, setting an index value identifying the second level that is finally increased to a predetermined level as an index value for the first texel;

if the second texel that does not match the first texel occurs, setting an index value identifying a level reduced by the predetermined value from the second level at which the second texel that does not match the first texel occurs as the index value for the first texel.

9. The method of claim 8, wherein the first level is level 0.

10. The method of claim 8, further comprising, when a texel value of the first texel differs from a texel value of the second texel by less than a threshold value, determining that the first texel and the second texel match.

11. The method of claim 8, wherein bit depths of the set index values are smaller than a total number of texture levels included in the mipmap.

12. The method of claim 8, wherein the set index values define a first index map, wherein a resolution of the first index map and a resolution of the texture of the first level are the same, and wherein the method further comprises:

dividing the first index map into a plurality of regions, each of the plurality of regions comprising a predetermined number of index values; and generating a second index map, having a resolution lower than a resolution of the first index map, by setting an index value related to a location in the second index map respectively corresponding to each of the plurality of divided regions, based on the predetermined number of index values included in each of the plurality of divided regions of the first index map.

13. The method of claim 12, wherein the index value related to the location in the second index map is set to be a minimum value among the predetermined number of index values included in the plurality of divided regions of the first index map.

14. An apparatus for rendering an object by using a mipmap comprising N+1 textures having resolutions of level 0 to level N, wherein a resolution decreases from level 0 to level N, the apparatus comprising:

a first memory configured to store texels related to the N+1 textures;

a second memory having an access rate faster than an access rate of the first memory, wherein the second memory is configured to cache the texels from the first memory; and a rendering unit configured to:

obtain a coordinate within the object of a pixel to be rendered, obtain an index value related to the obtained coordinate, wherein the index value identifies one of level 0 through level N;

determine an availability, in the second memory, of a cached texel related to the obtained coordinate among texels of a level identified by the index value, and if the cached texel is available, render the pixel by using the cached texel, wherein the mipmap comprises a first predetermined number of texture sets each of the predetermined number of texture sets comprising the N+1 textures, wherein the index value is stored in an index map related to the first predetermined number of texture sets, wherein each of a plurality of locations of the index map stores one of a second predetermined number of index values, wherein the second predetermined number is the same as the first predetermined number, and each of the second predetermined number of index values is related to one of the first predetermined number of texture sets, and wherein obtaining the index value comprises obtaining the index value related to a texture set used for the pixel to be rendered, from among the second predetermined number of index values.

15. A non-transitory computer readable recording medium having recorded thereon computer program instructions for causing a computer to implement a method of rendering an object using a mipmap comprising N+1 textures having resolutions of levels 0 through N, wherein a resolution decreases from level 0 to level N, the method comprising:

obtaining a coordinate within the object of a pixel to be rendered;

obtaining an index value related to the obtained coordinate, wherein the index value identifies one of the levels 0 through N;

determining an availability of a cached texel related to the obtained coordinate among texels in a level identified by the index value; and if the cached texel is available, rendering the pixel by using the cached texel, wherein the mipmap comprises a first predetermined number of texture sets each of the predetermined number of texture sets comprising the N+1 textures, wherein the index value is stored in an index map related to the first predetermined number of texture sets, wherein each of a plurality of locations of the index map stores one of a second predetermined number of index values, wherein the second predetermined number is the same as the first predetermined number, and each of the second predetermined number of index values is related to one of the first predetermined number of texture sets, and wherein obtaining the index value comprises obtaining the index value related to a texture set used for the pixel to be rendered, from among the second predetermined number of index values.

16. A method of rendering an object, the method comprising:

identifying a coordinate within the object of a pixel to be rendered;

obtaining, from an index map, an index value located within the index map at a location corresponding to the coordinate of the pixel to be rendered, wherein the index value identifies a level, from among levels 0 through N defining N+1 textures in a mipmap with resolutions decreasing from level 0 to level N;

determining an availability of a cached texel, associated with the coordinate of the pixel to be rendered, within the identified level;

if the cached texel is available, rendering the pixel using the cached texel, wherein the mipmap comprises a first predetermined number of texture sets each of the predetermined number of texture sets comprising the N+1 textures, wherein the index value is stored in an index map related to the first predetermined number of texture sets, wherein each of a plurality of locations of the index map stores one of a second predetermined number of index values, wherein the second predetermined number is the same as the first predetermined number, and each of the second predetermined number of index values is related to one of the first predetermined number of texture sets, and wherein obtaining the index value comprises obtaining the index value related to a texture set used for the pixel to be rendered, from among the second predetermined number of index values.

17. A method of generating an index value with respect to a mipmap comprising N+1 textures, the method comprising:

selecting a first level, from among levels 0 through N defining N+1 textures with resolutions decreasing from level 0 to level N;

determining whether a first texel in the first level 0 matches a second texel in a second level 1, higher than the first level 0, wherein a location of the first texel in the first level 0 corresponds to a location of the second texel in the second level 1;

if the first texel and the second texel do not match, identifying the first level 0 as an index value for the first texel;

if the first texel and the second texel match, repeatedly determining whether the first texel matches a texel in level 2 through level N, wherein the location of the first texel in the first level 0 corresponds to a location of the texel in level 2 through level N; and identifying a level, from among level 2 through level N, which is a highest level for which the first texel matches a texel, as an index value for the first texel.

* * * * *